United States Patent [19]

Meilleur

[11] Patent Number: 5,520,934
[45] Date of Patent: May 28, 1996

[54] PROCESS FOR MANUFACTURE OF LARGE BLOCKS OF PASTA FILATA CHEESE

[75] Inventor: Rheal P. Meilleur, Ingleside, Canada

[73] Assignee: Kraft Foods, Inc., Northfield, Ill.

[21] Appl. No.: 218,519

[22] Filed: Mar. 28, 1994

[51] Int. Cl.⁶ ..................................... A23C 19/06
[52] U.S. Cl. .............. 426/36; 426/34; 426/388; 426/512; 426/518; 426/582
[58] Field of Search ............... 426/34, 36, 582, 426/518, 495, 388, 512, 389

[56] References Cited

U.S. PATENT DOCUMENTS

| | | | |
|---|---|---|---|
| 2,733,148 | 1/1956 | Russo | 99/116 |
| 3,041,153 | 6/1962 | Elder et al. | 31/89 |
| 3,403,030 | 9/1968 | Pontecorvo et al. | 99/116 |
| 3,531,297 | 9/1970 | Kielsmeier et al. | 99/116 |
| 3,532,506 | 10/1970 | Rey et al. | 99/71 |
| 3,910,174 | 10/1975 | Nelles | 99/452 |
| 3,961,077 | 6/1976 | Kielsmeier | 426/36 |
| 3,969,995 | 7/1976 | Krueger et al. | 99/458 |
| 4,049,838 | 9/1977 | Krueger et al. | 426/478 |
| 4,185,126 | 1/1980 | Spors | 426/512 |
| 4,226,888 | 10/1980 | Siecker | 426/36 |
| 4,234,615 | 11/1980 | Krueger | 426/478 |
| 4,263,330 | 4/1981 | Streeter et al. | 426/36 |
| 4,382,969 | 5/1983 | Sadler | 426/518 |
| 4,898,745 | 2/1990 | Zamzow et al. | 426/582 |
| 4,919,943 | 4/1990 | Yee et al. | 426/39 |
| 4,942,052 | 7/1990 | Posdal | 426/518 |
| 5,175,014 | 12/1992 | Brockwell et al. | 426/582 |

FOREIGN PATENT DOCUMENTS

| | | |
|---|---|---|
| 0069282A1 | 1/1983 | European Pat. Off. . |
| WO92/07472 | 5/1992 | European Pat. Off. . |
| 1356181 | 5/1963 | France . |
| 2260293 | 9/1975 | France . |
| 3125154A1 | 1/1983 | Germany . |
| 2074435 | 11/1981 | United Kingdom . |

*Primary Examiner*—Donald E. Czaja
*Assistant Examiner*—Lien Tran
*Attorney, Agent, or Firm*—Fitch, Even, Tabin & Flannery

[57] ABSTRACT

A method is disclosed for manufacturing a block of pasta filata cheese of desired size and configuration, e.g., a 680-pound block, from finished pieces of pasta filata of typical size which may be about five pounds each. The method includes milling the finished pieces into shreds, filling the shreds into a cheese box to form a cheese mass, and while in the cheese box, applying pressure to the cheese mass, vacuuming and draining the cheese mass, and curing the cheese mass to form the desired block which can be used for a variety of end uses such as retail, slices, or food service.

11 Claims, 1 Drawing Sheet

FLOW CHART
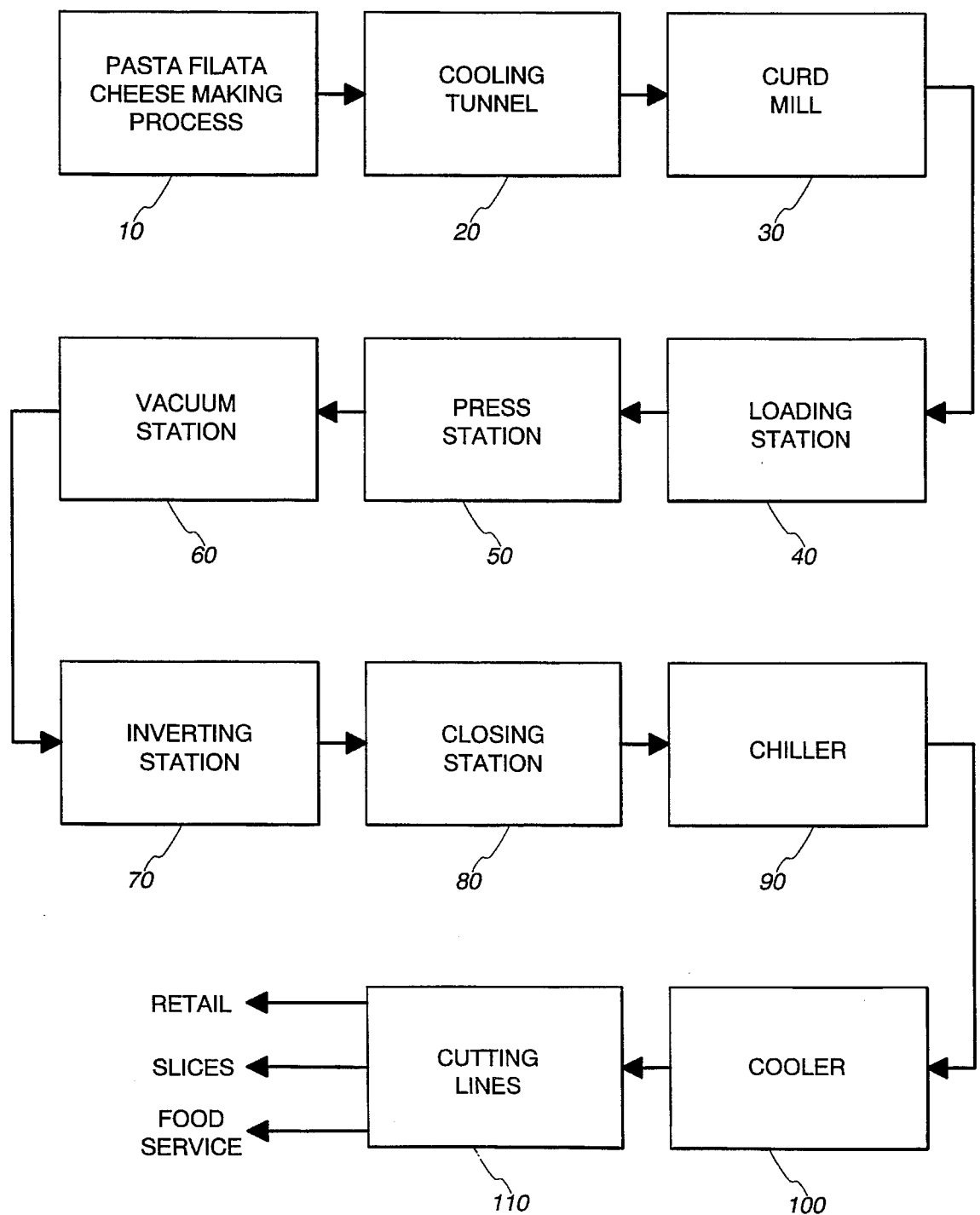

PROCESS FOR MANUFACTURE OF LARGE BLOCKS OF PASTA FILATA CHEESE

FIELD OF THE INVENTION

The present invention is directed to the manufacture of uniformly shaped large blocks of pasta filata cheese and more particularly to the manufacture of uniformly shaped large blocks of soft pasta filata cheese from a plurality of smaller fully finished pieces of soft pasta filata cheese. Large uniformly shaped blocks of pasta filata cheese have the benefit of simplified handling by modern equipment as well as flexibility for further uses, including the preparation of retail, slices, or food service portions of pasta filata cheese. Also within the scope of the invention are smaller blocks of any desired size and shape which my be formed by the same process from fully finished pieces of soft pasta filata cheese.

BACKGROUND OF THE INVENTION

The cheeses known as pasta filata (plastic curd) are Italian-type cheeses characterized by the fact that, after the whey is drained off, the curd is immersed in hot water or hot whey and is worked, stretched, and molded while it is in a plastic condition. Pasta filata cheese can be divided into two distinct types, hard cheeses such as provolone and caciocavallo which are salted and cured, i.e., ripened, for 2 to 12 months, and soft or moist cheeses such as mozzarella and scamorze which are eaten fresh with little or no ripening.

The present invention is directed to the soft pasta filata cheeses, principally mozzarella, and, as used herein, it is to be understood that the term pasta filata is intended to be limited to the soft uncured type. The traditional process for the manufacture of pasta filata cheese and several improvements are described in U.S. Pat. No. 4,898,745 issued to Zamzow et al. and assigned to the same party as the present application, the disclosure of which is incorporated herein by reference. This patent recognizes that considerable handworking is required in the manufacture of pasta filata cheese curd and that the process is complicated and subject to control problems. Because of these difficulties, pasta filata cheese generally is produced in small pieces, generally irregular in shape, of no more than about five pounds in weight.

For many years, the cheese industry has sought to be able to produce the various cheese varieties in large uniformly sized blocks which can readily be handled by large and modern cheese factory and food packaging equipment and yet retain the characteristics, e.g., appearance, texture and taste, of traditionally prepared cheese. Large blocks of cheese can readily be divided and packaged in a wide variety of sizes and shapes, for example, as smaller blocks for individual consumers, as 20 slices of varying thickness, width, and length, or in large blocks for food service applications. While large blocks of American type cheese has been successfully produced for a number of years, until the present invention, satisfactory large blocks of soft pasta filata cheese have not been obtainable.

Improved methods and apparatus for the manufacture of large American type cheese blocks involving the placement of fresh (uncured) curd into a large container are disclosed in U.S. Pat. Nos. 3,969,995 to Krueger, et al., 4,049,838 to Krueger, et al., and 4,234,615 to Krueger, all assigned to the same company as the present application, the disclosure of which are incorporated herein by reference. These patents focus on the draining of whey and the pressing of curd in a large container, preferably using drainer blades of a particular design. The inventions focused primarily on large sized blocks of American type natural cheese, such as cheddar or Colby varieties of cheese. Although the patents mention possible applicability to mozzarella cheese, in practice the disclosed invention has not been attempted for the manufacture of mozzarella or other pasta filata cheese because of the requirements for working, stretching and molding while in a plastic condition that is necessary to obtain acceptable pasta filata cheese. The methods and apparatus disclosed in the above-identified Krueger patents have not been used for soft pasta filata cheeses such as Italian mozzarella because the product is too hot for direct fill at a typical processing temperature of about 63° C. (145° F.). The hot cheese would caramelize (turn brown). On the other hand, cooling of soft pasta filata cheese results in characteristics which are not suitable for direct fill.

Another approach to the manufacture of large cheese blocks is described in U.S. Pat. No. 5,175,014. This patent discloses collating and consolidating successive layers of fresh uncured cheese blocks. The method disclosed in the '014 patent would not work for the manufacture of large blocks of soft pasta filata cheese for the same reasons explained above with respect to the requirements for processing such cheese.

While the methods of the above described patents may represent improvements in the conventional method for the manufacture of pasta filata cheese or for the manufacture of large blocks of cheese generally, it would be desirable to provide a method for making pasta filata-type cheeses in the form of a large uniformly shaped block.

Accordingly, it is an object of the present invention to provide an improved method for making a large uniformly shaped block of pasta filata cheese. It is another object of the present invention to provide a method for remolding a plurality of finished pieces of pasta filata cheese into one or more blocks of desired shape and size. It is a further object of the invention to provide a method for manufacturing a block of pasta filata cheese that is simple and economical and which maximizes the flexibility of the end uses of the cheese block.

SUMMARY

Generally, the present invention is directed to a method for making a uniformly shaped block of pasta filata cheese from a plurality of finished pieces of the same. The term "finished" is used to denote a piece of pasta filata cheese that is obtained from the pasta filata cheesemaking process in completed or finished form, i.e., ready to be eaten or otherwise consumed. The block product may be of large size and considerable weight, but the invention also permits the formation of blocks in a variety of sizes. In the method of the invention, the finished pieces of pasta filata cheese are comminuted into shreds in a curd mill, and the comminuted cheese is placed in a container where it is pressed, vacuumed, and drained. The cheese is then held under cool conditions for a time sufficient to cause the comminuted cheese to reknit into a single block of cheese of desired size and configuration.

DESCRIPTION OF THE DRAWING

The single FIGURE is a schematic flow chart depicting the practice of the present invention.

DETAILED DESCRIPTION OF THE INVENTION

The starting material for the method of the invention is finished pasta filata cheese which has been made in the usual way and which has been formed into pieces or loaves of the standard sizes, i.e., up to about five pounds in weight. A sufficient number of the pieces of finished cheese are comminuted, i.e., milled into shreds at a predetermined temperature and filled into one or more open ended containers or cheese molds of a desired size and shape.

The cheese shreds are subjected to an initial pressing step to consolidate shreds and initiate reknitting of the shreds into a single block of cheese. The bottom of the container is closed by a removable perforated drain plate to permit the removal of any whey that may have been expelled from the cured cheese as a result of the shredding step. The processed product is then exposed to a vacuum to remove any air trapped in the container. Removal of air aids in providing good body and texture to the finished cheese block.

After vacuuming, pressure is once again applied to the cheese mass within the container, the container is closed and is held at subambient temperatures for a time sufficient to permit the cheese mass to knit into a solid unitary block. These steps are accomplished by closing the top end of the container with a spring loaded pressure plate, inverting the container, removing the perforated drainer plate and closing the container with a solid end plate.

The temperature of the cheese mass is then quickly, over a period of a few days, cooled to a subambient temperature when it is held in a cooler until the cheese mass has reknitted into a solid block. The resulting solid block of cheese is then removed from the container and delivered to a cutting station where it is cut into preferred sizes for retail or food service usage. The invention permits the manufacture of a novel large block of pasta filata cheese having a weight of at least several multiples of five pounds. A variety of sizes and shapes for the new block are possible.

Preferably, for large scale operations involving a variety of further uses, the cheese box is of a size to permit formation of a 680-pound block of cheese. The dimensions of the large block may be about 22" by 28" by 28". About 136 small pieces or loaves of cheese are required for the production of each 680-pound block, assuming that each small block weighs about five pounds and further assuming that there are no significant losses of cheese, whey, or moisture. Additional small pieces may be required if some of the pieces weigh less than five pounds and/or to make up for losses.

Turning now to the single FIGURE, there is illustrated a flow chart for the manufacture of 680 pound blocks of mozzarella cheese from fully cured five pound loaves of mozzarella cheese. The present invention is intended to be integrated with a mozzarella cheese making operation such that the finished mozzarella loaves exiting the cheese making operation, which are typically at a temperature of between about 60° C. and 66° C., directly enter the described block making process.

In one embodiment of the invention, finished five pound mozzarella loaves exiting the cheese making operation 10 at a temperature of between about 60° C. and about 66° C. are introduced into a cooling tunnel 20 maintained at a temperature of between about 46° C. and about 52° C. for a period of between about 35 minutes and about 40 minutes in order that the loaves exiting the cooling tunnel will have an internal temperature of about 49° C. If the temperature of the mozzarella loaves introduced to the curd mill exceeds 52° C., the cheese may caramelize (turn brown). If the temperature is below about 46° C., the cheese will not knit properly and the product will have an open texture considered to be unacceptable.

It is, of course, possible to allow the mozzarella loaves to cool to ambient conditions prior to processing in accordance with the present invention. This might well be the case if the block making operation is located remotely from the loaf making operation. In such instances it will be necessary to heat the loaves to within the indicated temperature range of between about 46° C. and about 52° C. prior to milling. The mozzarella loaves, at a temperature of between about 46° C. and 52° C., most preferably at a temperature of between about 48° C. and 50° C. are milled into shreds in a curd mill 30 which may be of conventional design. The milling is essential because individual blocks of cheese of five pounds each would not knit properly due to the smooth surfaces on the outside of the blocks. In a typical curd mill the loaves of cheese are formed into shreds approximately ¾" by ¾" and up to approximately 3½" long. Alternately, the loaves may be cut into shreds of different dimensions so long as the shreds are of a size that will reknit into a block during processing.

The milled curds then are placed in an open ended container or cheese box which has a perforated drainer plate closing its lower end at cheese loading station 40. Preferably, the cheese box is the 680-pound size discussed herein, which is a standard box size. Alternatively, the cheese box may be of any size and configuration desired.

The filata cheese box is then transferred to press station 50. A cylinder actuated ram press plate is engaged with the exposed upper surface of the shredded cheese mass held within the cheese box and the cylinder is actuated to apply a pressure of between about 35 psi and about 45 psi, preferably between about 39 psi and about 41 psi for a period of between about 110 minutes and about 130 minutes. During the pressing operation, the temperature of the cheese mass in the cheese box is maintained above about 46° C.

The pressing operation causes consolidation of the shredded cheese mass in the cheese and a reduction in the cheese mass void volume. This facilitates the commencement of reknitting of the cheese shreds into a large block. The provision of the perforated drainer plate at the lower end of the cheese box permits draining of the small amount of whey, if any, that may be present.

No special drainer blades, such as are used in the process of U.S. Pat. No. 4,049,838, are required in the practice of the present invention because the whey was separated during the manufacture of the finished mozzarella loaves prior to milling.

From the pressing station 50 the cheese box is transferred to vacuum station 60 where it is exposed to a vacuum environment of below about 28" Hg and preferably below about 29" Hg for a period of between about 80 minutes and about 100 minutes, preferably between about 85 minutes and about 95 minutes. Typically the cheese box is placed in a vacuum chamber connected to a vacuum source.

Exposure of the cheese mass to vacuum causes air entrained within the mass to be expelled therefrom through the perforated drainer plate and around the periphery of the press plate. Removal of entrained air further facilitates and speeds up reknitting of the cheese mass into a unitary block. It is desirable to continue pressure against the upper surface of the cheese mass during exposure to vacuum. A pressure of between about 8 psi and about 12 psi, preferably between about 9 psi and about 11 psi has been found to produce good results.

The cheese next proceeds to inverting station 70 where the cheese mold box is inverted onto a shipping skid and the perforated drain plate is removed.

The cheese proceeds to closing station 80 where a pressure plate is installed and pressure is applied, e.g., with eight springs placed on the plate. A cover is installed, thereby pressing down the springs to apply pressure during cure. These steps are further explained in the aforementioned U.S. Pat. No. 4,234,615.

At this stage in the process, the temperature at the center of the 680 pound cheese block is typically between about 40° C. (104° F.) and about 46° C. (115° F.), preferably between about 42° C. (108° F.) and about 45° C. (113° F.) and the temperature at the surface of the cheese is between about 39° C. (102° F.) and about 45° C. (113° F.), preferably between about 41° C. (106° F.) and about 43° C. (109° F.).

It has been determined that in order to obtain cheese from the 680 pound block that is equal in quality to that of conventional pasta filata cheese, the cheese block must be cooled in a chiller 90 to a uniform temperature of less than 4.5° C. (40° F.) in less than 10 days, preferably between about 8 and about 10 days and thereafter cured for a period of time sufficient to permit the cheese mass to reknit into a unitary block. It is apparent that smaller blocks may cool and cure more quickly.

After chilling, the cheese proceeds to cooler 100 where it is cured for an adequate period of time to complete the knitting process. For 680 pound blocks, a curing temperature of between about 4.5° C. (40° F.) and about 6.5° C. (44° F.), preferably between about 5.5° C. (42° F.) and about 6.0° C. (43° F.), and a curing time of between about 3 weeks and about 6 weeks, preferably between about 3 weeks and about 5 weeks provides a highly desirable product.

Upon completion of curing the cheese block is removed from the cheese box and delivered to the cheese cutting lines 110 or to an appropriate storage area. At the cutting lines, the block can be cut into various retail packages, e.g. from 227 g. to 454 g. Alternatively, the block can be sliced for retail or food service use. Bulk sizes also are available for food service use, which may involve cutting the large block into smaller block sizes of up to about 40 pounds.

The invention is particularly applicable to mozzarella cheese because of the large demand for mozzarella cheese, for example, for use in pizza. The availability of a large block, e.g., 680 pounds, permits maximum flexibility in the further handling, packaging and processing of the cheese for a variety of end uses.

EXAMPLE I 136 finished pieces of mozzarella cheese, each piece weighing about 5 lbs., prepared by a conventional mozzarella make procedure are cooled from 145° F. to 120° F., using a cooling tunnel. The blocks of cheese are run through a curd mill cutting the blocks into small shreds which are of size approximately ¾"×¾" and approximately 3½" long. The milled curds are placed in a cheese mold box approximately 22" wide and 28" long and somewhat more than 28" deep.

The cheese mold box containing the curds is transferred to a press station where pressure is applied to the cheese curd using about 40 psi in a 6" cylinder, the pressure being spread across the top surface of the large block through the use of a pressure plate. A perforated plate placed in the bottom of the box allows for drainage of excess whey.

The cheese mold box is placed in a vacuum chamber for about 1½ hours at a vacuum measuring about 28" Hg. Pressure is applied to the cheese using 10 psi in a 6" cylinder, while the cheese is under vacuum. After the cheese has been pressed, vacuumed and drained, it is transferred to an inverting station where the cheese mold box is inverted onto a shipping skid and the perforated drain plate is removed.

The cheese then is transferred to a closing station where a pressure plate is installed and pressure is applied through the use of 8 springs placed on the plate. A cover is installed pressing down on the springs to apply a pressure of about 500 psi. The cheese is then quickly cooled to a temperature of about −2° C. (28° F.) within a period of about 10 days, in a quick chiller. The cheese then is cured at a temperature of 5.5° C. (42° F.) for four weeks.

The resulting finished product is a block of mozzarella cheese having a weight of about 680 pounds and having dimensions of about 2"×28"×28". The large block can be cut into various smaller size blocks or sliced into slices, without falling apart and without unsightly seam lines inside the large block.

What is claimed is:

1. A method for manufacturing a large block of pasta filata cheese from multiple finished pieces of said cheese which have been made by preparing curds and whey, draining said whey from said curds, immersing said curds in hot liquid, stretching said curds to form pasta filata cheese, and molding said pasta filata cheese into finished pieces of pasta filata cheese, comprising the steps of equilibrating said finished pieces to a temperature of between about 46° C. and about 52° C., milling said finished pieces in order to provide shreds of a size that will reknit into a block during processing, filling said shreds into a cheese box which does not contain a drainage blade to form a cheese mass, and while in said cheese box applying pressure to said cheese mass while maintaining a temperature above about 46° C. in order to consolidate said mass and reduce its void volume, vacuuming said cheese mass while applying pressure in order to remove entrained air and to facilitate reknitting of said mass, cooling said cheese mass, and curing said cheese mass to form said block.

2. A method in accordance with claim 1 wherein the finished pieces have a weight of about 5 pounds and the block has a weight of about 680 pounds.

3. A method in accordance with claim 2 wherein the dimensions of the block are about 22" by 28" by 28".

4. A method in accordance with claim 1 wherein the finished pieces are milled to a shred size of approximately ¾" by ¾" and up to approximately 3 and ½" long.

5. A method in accordance with claim 1 wherein the finished pieces are equilibrated to a temperature of about 120 degrees F. before milling.

6. A method in accordance with claim 1 wherein the pressure applied is about 40 p.s.i. on the top surface of the cheese mass for about 2 hours.

7. A method in accordance with claim 6 wherein the vacuuming is performed in a vacuum chamber for about 1 and ½ hours at full vacuum of at least about 28" Hg.

8. A method in accordance with claim 7 wherein pressure of about 10 p.s.i. is applied to the top surface of the cheese mass while under vacuum.

9. A method in accordance with claim 1 comprising additional steps after draining the cheese mass, including inverting the cheese box and applying further pressure to the cheese mass.

10. A method in accordance with claim 9 comprising additional steps after applying further pressure to the cheese mass, including cooling the cheese mass to a temperature below 40 degrees F. within a period of about 10 days or less, and curing the cheese mass at a cool temperature for about 4 weeks.

11. A method for manufacturing a large block of pasta filata cheese from several smaller finished pieces of said cheese which have been made by preparing curds and whey, daining said whey from said curds, immersing said curds in hot liquid, stretching said curds to form pasta filata cheese, and molding said pasta filata cheese into finished pieces of pasta filata cheese, comprising the steps of equilibrating said finished pieces to a temperature of about 120 degree F., milling said finished pieces into shreds, filling said shreds into a cheese box which does not contain a drainage blade to form a cheese mass, and while in said cheese box, applying pressure to said cheese mass, vacuuming said cheese mass, draining said cheese mass, inverting said cheese mass, applying further pressure to said cheese mass, cooling said cheese mass to a temperature below about 40 degrees F. within a period of about 10 days or less, and curing said cheese mass at a cool temperature for about 4 weeks to form the large block.

* * * * *